United States Patent [19]

Bloeckl

[11] Patent Number: 5,764,038
[45] Date of Patent: Jun. 9, 1998

[54] CIRCUIT CONFIGURATION FOR LIMITING THE OUTPUT VOLTAGE OF A SWITCHED MODE VOLTAGE REGULATOR

[75] Inventor: Reinhard Bloeckl, Unterhaching, Germany

[73] Assignee: Siemens Aktiengesellschaft, Munich, Germany

[21] Appl. No.: 802,120

[22] Filed: Feb. 19, 1997

Related U.S. Application Data

[63] Continuation of Ser. No. 316,638, Sep. 30, 1994, abandoned.

[30] Foreign Application Priority Data

Sep. 30, 1993 [DE] Germany ............... 43 33 473.3

[51] Int. Cl.$^6$ ........................................ G05F 1/10
[52] U.S. Cl. .................... 323/222; 323/280; 323/284; 323/285
[58] Field of Search ............................ 323/280, 276, 323/223, 284, 285, 222; 361/91

[56] References Cited

U.S. PATENT DOCUMENTS

| 4,437,048 | 3/1984 | Arnold ........................ 318/663 |
| 5,029,269 | 7/1991 | Elliott et al. ................ 361/91 |

FOREIGN PATENT DOCUMENTS 0345624  12/1989  European Pat. Off. .

OTHER PUBLICATIONS

Electronic Design, Jun. 1989 (Goodenough) "PWM Controller Chip Fixes Power Factor" pp. 81–84.
Siemens Components, 31, 1993, No. 2, pp. 46–50, (Schott) "Power–Factor–Controller TDA 4815/19".

Primary Examiner—Edward Tso
Assistant Examiner—Shawn Riley
Attorney, Agent, or Firm—Herbert L. Lerner; Laurence A. Greenberg

[57] ABSTRACT

A switched-mode voltage regulator includes a control unit receiving a direct voltage to be regulated and having an output at which an output voltage can be picked up. A voltage regulator amplifier receives the output voltage and a reference voltage and supplies an output signal. A multiplier unit multiplies the output signal of the voltage regulator amplifier with a signal obtained from the direct voltage to be regulated and supplies an output signal. A current regulator amplifier receives the output signal of the multiplier and a signal obtained from the direct voltage to be regulated. A driver stage converts the output signal of the current regulator amplifier into a trigger signal for the control unit. A circuit configuration for limiting the output voltage of the switched-mode voltage regulator includes an overvoltage amplifier generating an output signal as a function of the output voltage of the control unit. In one embodiment, the multiplier unit multiplies the output signal of the overvoltage amplifier with the output signal of the voltage regulator amplifier and the signal obtained from the direct voltage to be regulated. In another embodiment, the outputs of the overvoltage amplifier and the voltage regulator amplifier are interconnected for limiting an output voltage value of the voltage regulator amplifier to a maximum voltage value.

5 Claims, 2 Drawing Sheets

CIRCUIT CONFIGURATION FOR LIMITING THE OUTPUT VOLTAGE OF A SWITCHED MODE VOLTAGE REGULATOR This application is a continuation of application Ser. No. 08/316,638, filed on Sep. 40, 2995, now abandoned.

BACKGROUND OF THE INVENTION

Field of the Invention

The invention relates to a circuit configuration for limiting the output voltage of a switched-mode voltage regulator, wherein the switched-mode voltage regulator includes a control unit receiving the direct voltage to be regulated and having an output at which the output voltage can be picked up; a voltage regulator amplifier receiving the output voltage and a reference voltage; a multiplier unit multiplying the output signal of the voltage regulator amplifier by a signal obtained from the direct voltage to be regulated; a current regulator amplifier receiving the output signal of the multiplier and a signal obtained from the direct voltage to be regulated; and a driver stage converting the output signal of the current regulator amplifier into a trigger signal for the control unit.

One such configuration is known, for example, from Siemens Components 31 (1993), Number 2, pages 46 ff. FIG. 2 on page 48 of that publication shows one such regulator structure with a multiplier between the voltage regulator and the current regulator, as a result of which the curve form of the input voltage is forced upon the command value for the current. In that way, an optimal curve form for the mains current being picked up results even in the partial-load range, and is maintained even if the peak value of the input voltage extends as far as the output voltage. Radio noise suppression is easily attainable with the use of that kind of regulator structure. However, the voltage regulation must be slow so as to attain a power factor as close as possible to 1, although that causes dynamic voltage overswings at the output which can threaten components located farther along in the circuit.

In order to enable that overvoltage to be limited, a simple comparator may, for instance, be provided that digitally switches off the driver output, i.e. the triggering of the control element, if an overvoltage occurs. However, in such regulators with a fixed operating frequency, such a digital overvoltage shutoff is completely asynchronous with respect to both the operating frequency and the mains frequency. With frequency superposition, the result is distortion of the input current with a high proportion of harmonics that also includes components which are nonharmonic (relative to the mains frequency). That not only misses the target of attaining sinusoidal current pickup, but causes disruptive noise from components, such as ferrite cores, that are capable of radiating acoustically.

SUMMARY OF THE INVENTION

It is accordingly an object of the invention to provide a circuit configuration for limiting the output voltage of a switched-mode voltage regulator, which overcomes the hereinafore-mentioned disadvantages of the heretofore-known devices of this general type.

With the foregoing and other objects in view there is provided, in accordance with the invention, in a switched-mode voltage regulator including a control unit receiving a direct voltage to be regulated and having an output at which an output voltage can be picked up; a voltage regulator amplifier receiving the output voltage and a reference voltage and supplying an output signal; a multiplier unit multiplying the output signal of the voltage regulator amplifier with a signal obtained from the direct voltage to be regulated and supplying an output signal; a current regulator amplifier receiving the output signal of the multiplier and a signal obtained from the direct voltage to be regulated; and a driver stage converting the output signal of the current regulator amplifier into a trigger signal for the control unit, a circuit configuration for limiting the output voltage of the switched-mode voltage regulator, comprising an overvoltage amplifier generating an output signal as a function of the output voltage of the control unit; the multiplier unit multiplying the output signal of the overvoltage amplifier with the output signal of the voltage regulator amplifier and the signal obtained from the direct voltage to be regulated.

In accordance with another feature of the invention, the overvoltage amplifier includes a feedback operational amplifier having an open collector output, one input receiving the output voltage, another input receiving a reference voltage, and an output being connected to the multiplier unit.

In accordance with a further feature of the invention, the voltage regulator amplifier includes an operational amplifier having one input receiving the output voltage, another input receiving a reference voltage, and an output, one of the inputs being an inverting input; and a parallel circuit of a resistor and a capacitor being connected between the output of the voltage regulator amplifier and the inverting input of the voltage regulator amplifier.

With the objects of the invention in view, there is also provided, in a switched-mode voltage regulator including a control unit receiving a direct voltage to be regulated and having an output at which an output voltage can be picked up; a voltage regulator amplifier receiving the output voltage and a reference voltage and supplying an output signal at an output; a multiplier unit multiplying the output signal of the voltage regulator amplifier with a signal obtained from the direct voltage to be regulated and supplying an output signal; a current regulator amplifier receiving the output signal of the multiplier and a signal obtained from the direct voltage to be regulated; and a driver stage converting the output signal of the current regulator amplifier into a trigger signal for the control unit, a circuit configuration for limiting the output voltage of the switched-mode voltage regulator, comprising an overvoltage amplifier having an output at which an output signal is generated as a function of the output voltage of the control unit; the outputs of the overvoltage amplifier and the voltage regulator amplifier being interconnected for limiting an output voltage value of the voltage regulator amplifier to a maximum voltage value.

An advantage of the invention is that an overvoltage comparator is replaced with an overvoltage amplifier, which does not shut off the triggering of the control element digitally, but instead acts as a linear regulator to reduce the amplitude of the current being supplied until the overvoltage at the output has been rescinded. The overvoltage regulator operates parallel to the actual voltage regulator. Although it does not intervene until overvoltage occurs, when it does intervene, it does so substantially faster dynamically than the voltage regulator.

The configuration according to the invention avoids nonharmonic frequency components of the input current, and the harmonic distortion of the input current is reduced to the minimum that is absolutely required. Moreover, noise is not produced when the overvoltage limitation responds.

Other features which are considered as characteristic for the invention are set forth in the appended claims.

Although the invention is illustrated and described herein as embodied in a circuit configuration for limiting the output voltage of a clocked voltage regulator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
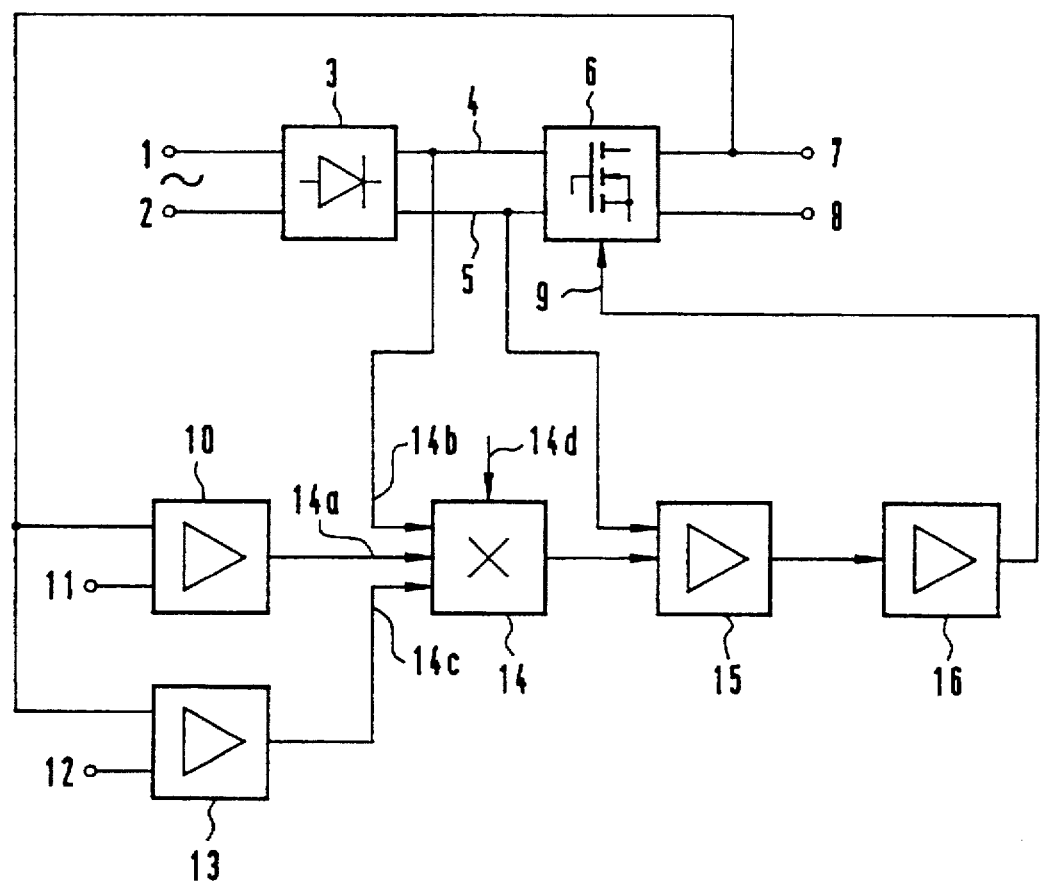
FIG. 1 is a block circuit diagram of a configuration according to the invention.

Referring now to the figures of the drawing in detail and first, particularly, to FIG. 1 thereof, it is seen that reference numerals 1 and 2 designate input terminals, to which an alternating voltage can be applied. The input terminals are connected to a rectifier unit 3, which has output lines 4 and 5 at which a rectified voltage can be picked up. This voltage is supplied to a control unit 6. An output of the control unit 6 is connected to terminals 7 and 8 at which a regulated output voltage can be picked up. Reference numeral 9 indicates a control input of the control unit 6. The output terminal 7 is connected to a first input of a voltage regulator amplifier 10 and to a first input of an overvoltage amplifier 13. The voltage regulator amplifier 10 and the overvoltage amplifier 13 each have a respective input terminals 11 and 12, to which a reference voltage can be applied. An output of the voltage regulator amplifier 10 is connected to a first input 14a of the multiplier unit 14. A second input 14b of the multiplier unit 14 is connected to the line 4. A third input 14c of the multiplier unit 14 is connected to an output of the overvoltage amplifier 13. An additional input 14d of the multiplier unit 14 may also be provided. An output signal of the multiplier unit 14 is supplied to a first input of a current regulator amplifier 15. A second input of the current regulator amplifier 15 is connected to the line 5. An output signal of the current regulator amplifier 15 is supplied to a driver stage 16. An output signal of the driver stage 16 is supplied to the control input 9 of the control unit 6.

It has been found that both the threshold value for activating the overvoltage limitation and the amplification with which the intervention is made must remain controllable, in order to assure adaptation to given conditions in the regulating unit involved.

Processing of the output signal of the overvoltage regulator 13 is performed by multiplication with the output signal of the voltage regulator amplifier 10, which is performed by the multiplier unit 14. This is necessary in order to make the intervention of the overvoltage limitation independent of the random voltage value at the output of the voltage regulator amplifier 10.

An exemplary embodiment of the circuit configuration of the invention will be described below in conjunction with FIG. 2. Identical components are identified by the same reference numerals. The control unit 6 includes an inductive resistor 21, which is connected on one hand to the line 4 and on the other hand, through a diode 23 connected in the flow direction, to the output terminal 7. A junction of the inductive resistor 21 and the diode 23 is connected to a drain terminal of a MOSFET 22. A source terminal of the MOSFET 22 is connected to the output terminal 8. A capacitor 24 is connected between the output terminal 7 and the output terminal 8.

Figure 3:
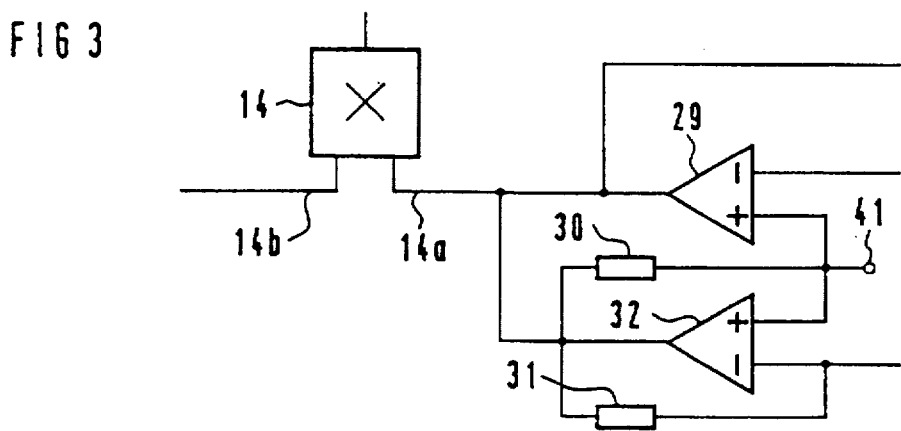
FIG. 3 is a schematic and block circuit diagram of a portion of a further embodiment of the configuration of the invention.

This configuration is equivalent to a control unit 6 in accordance with FIG. 3 on page 48 of Siemens Components 31 (1993), Number 2, referred to above in the introduction. A resistor 18 is connected between the output terminal 8 and the line 5 for current measurement. A symbolically illustrated load 25 is connected to the output between the terminals 7 and 8. The line 4 is connected to ground through a series circuit including resistors 17 and 19. A pickup that is connected to the second input 14b of the multiplier 14 is effected at a node point of the series circuit of the two resistors 17 and 19. The line 5 is connected through a resistor 20 to a positive input of an operational amplifier 26. The output terminal 7 is connected to ground through a series circuit of three resistors 37, 39, 40, with the resistor 40 being connected toward ground. A node point of the series circuit of the resistors 37 and 39 is connected through a resistor 38 to an inverting input of an operational amplifier 29. An output of the operational amplifier 29 is fed back to its inverting input through a parallel circuit of a resistor 35 and a capacitor 36. A positive input of the operational amplifier 29 is connected to a terminal 41, to which a reference voltage can be supplied. A node point of the resistors 39 and 40 is connected through a series circuit of two resistors 33 and 34 to an inverting input of an operational amplifier 32. A positive input of the operational amplifier 32 is likewise connected to the input terminal 41. An output of the operational amplifier 32 is connected on one hand through a resistor 30 to the positive input, and on the other hand through a resistor 31 to the inverting input, of the operational amplifier 32. The output of the operational amplifier 32 is also connected to the third input 14c of the multiplier 14.

An output of the operational amplifier 29 is connected to the first input 14a of the multiplier 14. An output of the multiplier 14 is connected on one hand through a resistor 28 to ground, and on the other hand to an inverting input of the operational amplifier 26. An output of the operational amplifier 26 is connected through a capacitor 27 to its inverting input. The output of the operational amplifier 26 is also connected to the input of the driver stage 16. The output of the driver stage 16 is connected to a gate terminal of the MOSFET 22.

Figure 2:
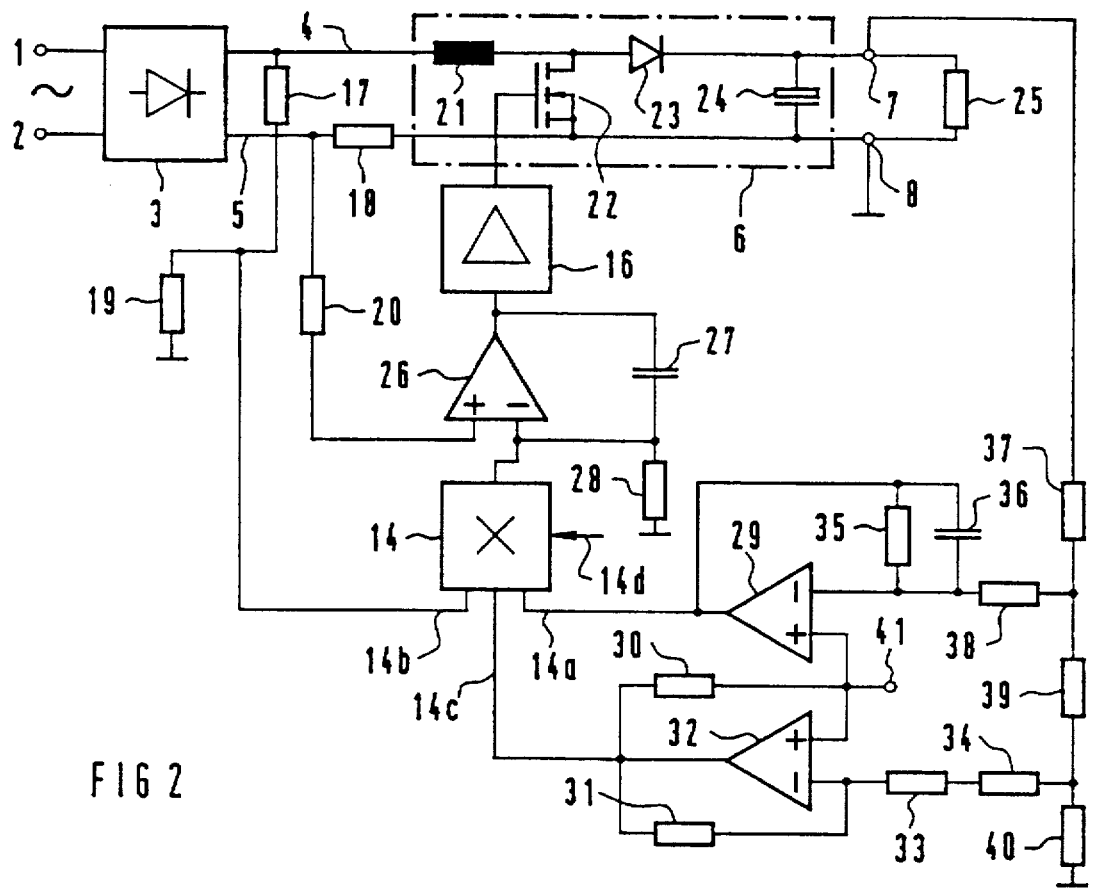
FIG. 2 is a schematic and block circuit diagram of an exemplary embodiment of FIG. 1.

The voltage regulator (boost converter) shown in FIG. 1 and the relevant parts of the open-loop and closed-loop control circuit are shown in FIG. 2. The output voltage at the output terminal 7 passes through the resistance dividers 37, 39, 40 to reach the operational amplifier 29, which acts as a voltage regulator and is wired with a high time constant that is determined by the resistor 35 and the capacitor 36, or in other words it is slow-wired. A ratio between the overvoltage threshold and the rated voltage is adjustable by means of the resistors 39 and 40.

If an overvoltage is present, then the overvoltage regulator or in other words the operational amplifier 32, which has an open collector output, lowers its output voltage, and it reduces the output signal of the multiplier 14 through the third input 14c of the multiplier. The value of this output current becomes $$I = \frac{k \cdot M2 \cdot (M3 - V_{REF}) \cdot (M4 - 1V)}{W}$$

The variable M2 is the value of the voltage at the input terminal 14b; the variable M3 is the output voltage of the operational amplifier 29 at the input terminal 14a; and the variable M4 is the output voltage of the operational amplifier 32 at the terminal 14c. W stands for a variable that can be applied to the fourth input terminal 14d of the multiplier 14. In the example described above, the multiplier input 14c may have a reference voltage of 1 volt, and as a result, $U_{cesat}$ of the output operational amplifier 32 does not play any role.

The amplification of the operational amplifier 32 can be defined internally at 30, for instance, but can also be reduced or adapted by means of the resistor 34, that is provided externally in the event of integration, for example. If that resistor is replaced by a short circuit, for instance, then an overvoltage of 2% above the set threshold value leads to a reduction in the multiplier output current I to 0 μA, as a result of which both the driver stage 16 and the MOSFET 22 are shut off entirely, through the operational amplifier 26 acting as a current regulator. It is not until the overvoltage has dropped below the threshold value that the operational amplifier 29 acting as the voltage regulator resumes regulation.

FIG. 3 shows a modified portion of the circuit configuration shown in FIG. 2. In it, only those elements that are connected differently are shown. All of the other elements that are not shown in FIG. 3 are equivalent to those shown in FIG. 2.

In FIG. 3, the additional input 14c of the multiplier 14 is also omitted, if the output of the operational amplifier 32 is coupled directly to the output of the voltage regulator amplifier 29. Then the overvoltage amplifier 32 limits the output voltage of the voltage regulator amplifier.

I claim:

1. In a switched-mode voltage regulator including: a control unit receiving a direct voltage to be regulated and having an output at which an output voltage can be picked up;

a voltage regulator amplifier receiving the output voltage and a reference voltage and supplying an output signal;

a linear multiplier unit multiplying the output signal of the voltage regulator amplifier with a signal obtained from the direct voltage to be regulated and supplying an output signal;

a current regulator amplifier receiving the output signal of the multiplier and a signal obtained from the direct voltage to be regulated; and a driver stage converting the output signal of the current regulator amplifier into a trigger signal for the control unit, a circuit configuration for limiting the output voltage of the switched-mode voltage regulator, comprising:

an overvoltage amplifier generating an output signal as a function of the output voltage of the control unit;

the multiplier unit multiplying the output signal of said overvoltage amplifier with the output signal of the voltage regulator amplifier and the signal obtained from the direct voltage to be regulated.

2. The circuit configuration according to claim 1, wherein said overvoltage amplifier includes a feedback operational amplifier having an open collector output, one input receiving the output voltage, another input receiving a reference voltage, and an output being connected to the multiplier unit.

3. The circuit configuration according to claim 1, wherein the voltage regulator amplifier includes an operational amplifier having one input receiving the output voltage, another input receiving a reference voltage, and an output, one of the inputs being an inverting input; and a parallel circuit of a resistor and a capacitor being connected between the output of the voltage regulator amplifier and the inverting input of the voltage regulator amplifier.

4. The circuit configuration according to claim 2, wherein the voltage regulator amplifier includes an operational amplifier having one input receiving the output voltage, another input receiving a reference voltage, and an output, one of the inputs being an inverting input; and a parallel circuit of a resistor and a capacitor being connected between the output of the voltage regulator amplifier and the inverting input of the voltage regulator amplifier.

5. In a switched-mode voltage regulator including:

a control unit receiving a direct voltage to be regulated and having an output at which an output voltage can be picked up;

a voltage regulator amplifier receiving the output voltage and a reference voltage and supplying an output signal at an output;

a linear multiplier unit multiplying the output signal of the voltage regulator amplifier with a signal obtained from the direct voltage to be regulated and supplying an output signal;

a current regulator amplifier receiving the output signal of the multiplier and a signal obtained from the direct voltage to be regulated; and a driver stage converting the output signal of the current regulator amplifier into a trigger signal for the control unit, a circuit configuration for limiting the output voltage of the switched-mode voltage regulator, comprising:

an overvoltage amplifier having an output at which an output signal is generated as a function of the output voltage of the control unit;

the outputs of said overvoltage amplifier and the voltage regulator amplifier being interconnected for limiting an output voltage value of the voltage regulator amplifier to a maximum voltage value.

* * * * *